(12) United States Patent
Saint-Jalmes et al.

(10) Patent No.: US 7,320,446 B2
(45) Date of Patent: Jan. 22, 2008

(54) INTERIOR LAYOUT OF AN AIRCRAFT CABIN

(75) Inventors: Bruno Saint-Jalmes, Toulouse (FR); Andre Rezag, Toulouse (FR); Jason Zaneboni, Toulouse (FR)

(73) Assignee: Airbus, Blagnac (FR)

( * ) Notice: Subject to any disclaimer, the term of this patent is extended or adjusted under 35 U.S.C. 154(b) by 0 days.

(21) Appl. No.: 11/065,559

(22) Filed: Feb. 25, 2005

(65) Prior Publication Data

US 2005/0211837 A1   Sep. 29, 2005

Related U.S. Application Data

(60) Provisional application No. 60/560,609, filed on Apr. 9, 2004.

(30) Foreign Application Priority Data

Feb. 26, 2004   (FR)   ................... 04 01958

(51) Int. Cl.
*B64D 11/06* (2006.01)
(52) U.S. Cl. .................................. 244/118.6
(58) Field of Classification Search .. 244/118.1–118.6, 244/122 AH, 122 R; 5/9.1, 10.1, 10.5; 297/232–257
See application file for complete search history.

(56) References Cited

U.S. PATENT DOCUMENTS

| | | | |
|---|---|---|---|
| 1,515,576 A * | 11/1924 | Gentzcke | 105/315 |
| 1,743,149 A * | 1/1930 | Lyford | 296/64 |
| 1,948,200 A * | 2/1934 | Bromagem | 297/249 |
| 2,046,859 A * | 7/1936 | Weiss et al. | 296/64 |
| 2,280,065 A * | 4/1942 | De Roode | 244/118.6 |
| 2,310,573 A * | 2/1943 | Burton | 244/118.6 |
| 2,332,841 A * | 10/1943 | Buckwalter et al. | 244/118.6 |
| 2,382,402 A * | 8/1945 | De Roode | 244/118.6 |
| 2,414,730 A * | 1/1947 | Flogaus | 296/64 |
| 2,557,885 A * | 6/1951 | Murphy et al. | 105/344 |
| 2,583,960 A * | 1/1952 | Murphy | 105/315 |
| 2,608,366 A * | 8/1952 | Jergenson | 244/118.6 |
| 2,947,349 A * | 8/1960 | Kryter | 297/174 R |
| 2,963,988 A * | 12/1960 | Murphy | 105/315 |
| 3,730,583 A * | 5/1973 | Colovas et al. | 296/64 |
| 4,382,628 A * | 5/1983 | Palmgren | 297/232 |

(Continued)

FOREIGN PATENT DOCUMENTS

EP   1 162 138   12/2001

(Continued)

*Primary Examiner*—Timothy D. Collins
(74) *Attorney, Agent, or Firm*—Oblon, Spivak, McClelland, Maier & Neustadt, P.C.

(57) ABSTRACT

This layout shows a set or assembly of aircraft seats to outfit an aircraft cabin, comprising at least two columns of neighboring seats. The seats are arranged one behind the other in each of the columns of seats. Moreover, each seat can be converted into a sleeper so as to present a considerably stretched out sleeping surface. Each seat when converted into a sleeper, has a first sleeping portion and at least a second sleeping portion that is narrower than the first. In two neighboring columns, the seats are staggered, in such a way that the first part of a seat of a column is facing a second portion of a seat of the second column that is narrower in width.

28 Claims, 2 Drawing Sheets

U.S. PATENT DOCUMENTS

| | | | |
|---|---|---|---|
| 4,674,713 A * | 6/1987 | Ryan et al. | 244/122 R |
| 4,686,908 A * | 8/1987 | Legrand | 105/315 |
| 4,936,620 A * | 6/1990 | Francois et al. | 296/64 |
| 5,265,828 A * | 11/1993 | Bennington | 244/122 R |
| 5,716,026 A * | 2/1998 | Pascasio et al. | 244/118.6 |
| 5,857,745 A * | 1/1999 | Matsumiya | 297/354.13 |
| 6,056,239 A * | 5/2000 | Cantu et al. | 244/118.6 |
| 6,209,956 B1 * | 4/2001 | Dryburgh et al. | 297/245 |
| 6,227,489 B1 * | 5/2001 | Kitamoto et al. | 244/118.5 |
| 6,237,872 B1 * | 5/2001 | Bar-Levav | 244/118.6 |
| 6,692,069 B2 * | 2/2004 | Beroth et al. | 297/118 |
| 6,913,227 B1 * | 7/2005 | Mahmulyin | 244/118.5 |
| 2001/0003962 A1 * | 6/2001 | Park et al. | 108/140 |
| 2002/0070314 A1 * | 6/2002 | Schmidt-Schaeffer | 244/118.6 |
| 2003/0098391 A1 * | 5/2003 | Sankrithi et al. | 244/118.6 |
| 2003/0218095 A1 * | 11/2003 | Saint Jalmes | 244/118.5 |
| 2004/0232283 A1 * | 11/2004 | Ferry et al. | 244/118.6 |
| 2005/0001097 A1 * | 1/2005 | Saint-Jalmes | 244/118.6 |
| 2005/0001098 A1 * | 1/2005 | Saint-Jalmes | 244/118.6 |
| 2005/0023413 A1 * | 2/2005 | Saint-Jalmes | 244/118.6 |
| 2005/0067870 A1 * | 3/2005 | Rezag et al. | 297/354.13 |
| 2005/0189451 A1 * | 9/2005 | Mercier | 244/118.6 |
| 2005/0189804 A1 * | 9/2005 | Mercier | 297/232 |

FOREIGN PATENT DOCUMENTS

| | | |
|---|---|---|
| EP | 1 364 874 | 11/2003 |
| WO | 03/013903 | 2/2003 |
| WO | 03/053735 | 7/2003 |

\* cited by examiner

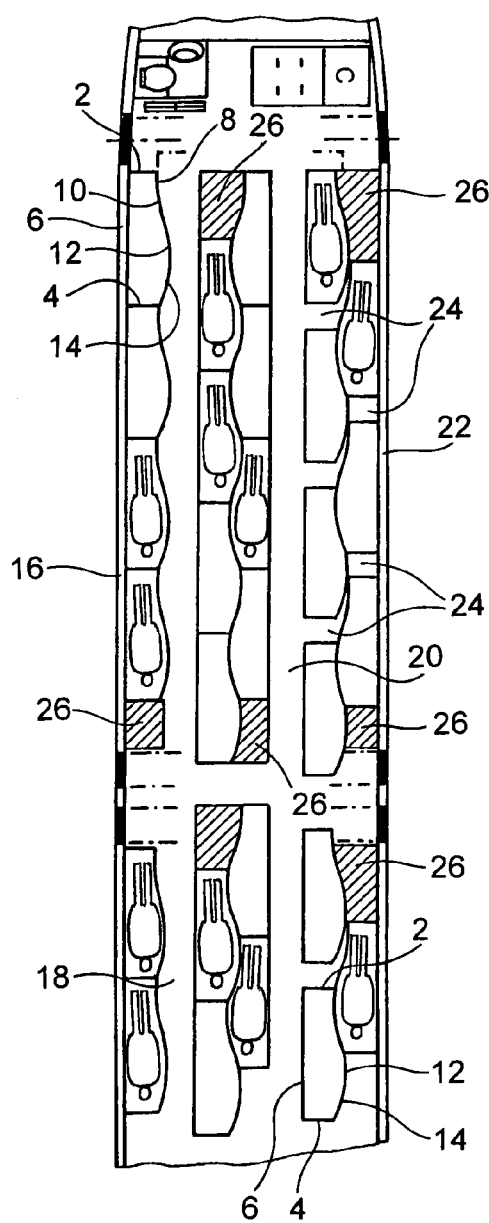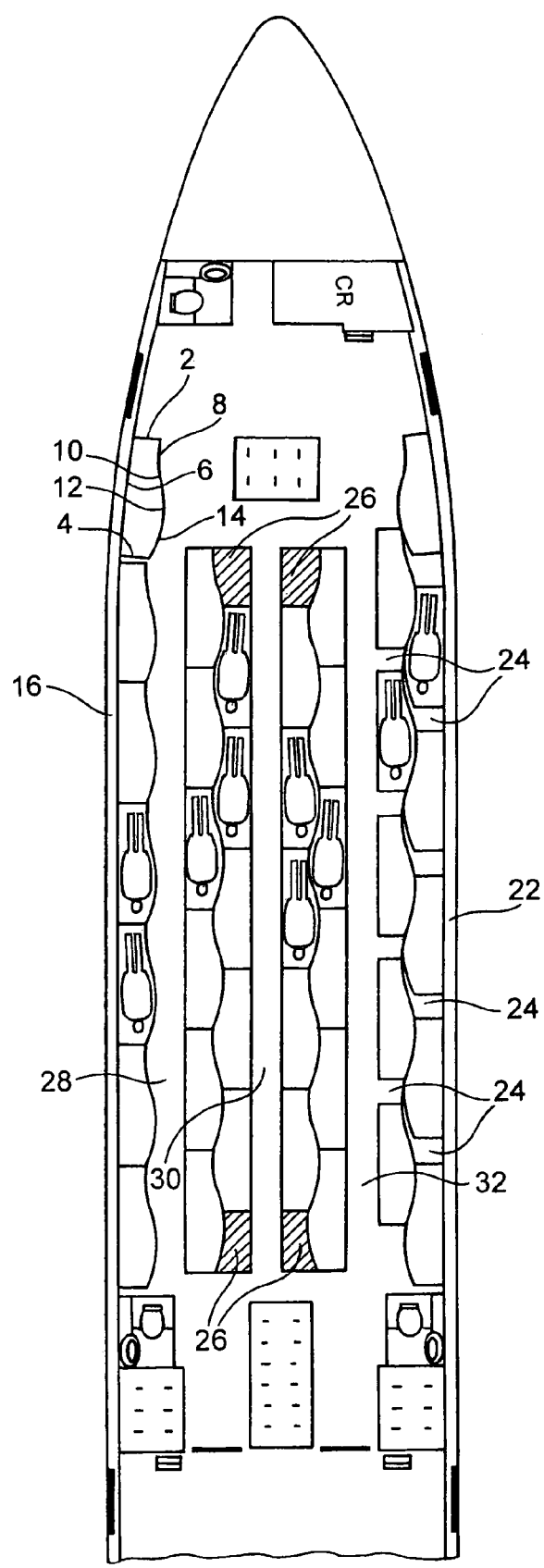
Fig.1
Fig.2

INTERIOR LAYOUT OF AN AIRCRAFT CABIN

CROSS-REFERENCE TO RELATED APPLICATIONS

This application claims priority to French Application No. 04.01958, filed Feb. 26, 2004 and U.S. Provisional Application No. 60/560,609, filed Apr. 9, 2004, the entire content of both of which is hereby incorporated by reference.

BACKGROUND OF THE INVENTION

1. Field of the Invention

The invention involves the interior layout of an aircraft cabin.

2. Discussion of the Background

The scope of this invention is the interior layout of aircraft used for passenger transport and in particular, commercial aircraft operated by airlines. In such an aircraft, each passenger has a seat but according to the compartment or section where the seat is located, comfort of such seat is varies upward or downward. As such, for instance, certain aircraft comprise three classes which are commonly called, economy class, business class and first class.

In general, for all classes of comfort, seats are positioned in transversal rows with respect to the centerline of the aircraft (or the direction of travel of the plane) as well as in longitudinal columns.

To make their fleets of aircraft profitable, airlines have a dual concern. On the one hand, they want to carry the largest number of passenger in a given space (the aircraft cabin) and on the other hand, they want to keep their customers happy and gain their loyalty by offering them the best possible services in terms of comfort and space. Several documents exist, such as for instance, WO-03/053735 and FR-2 843 730, that propose interior aircraft cabin layouts that permit optimizing the space available in such a cabin.

SUMMARY OF THE INVENTION

In particular, this invention involves the business class and first class sections in which passengers can travel in the stretched out position. Document EP-1 364 874 displays an individual module for the aircraft passenger, which combined with other similar modules, permits occupying, in an optimized way, the space available in an aircraft cabin while respecting the technical constraints imposed by the aeronautical standards. Illustrations of this document show module combinations that permit accommodating a large number of passengers in a cabin. However, in the proposed layouts, certain seats are oriented in the direction of travel of the aircraft, while others are oriented in the opposite way.

As such, the purpose of this invention is to provide an aircraft cabin layout that allows the inclusion of a maximum number of passengers in a given space, with all seats for receiving passengers for this layout turned in the same direction.

For this purpose, it proposes a set or assembly of aircraft seats to be located in an aircraft cabin, that comprises at least two neighboring columns of seats, with the seats arranged one behind the other in each of the columns of seats and each seat being convertible into a sleeper so as to present a considerably stretched out sleeping surface.

According to the invention, each seat when converted into a sleeper shows a first sleeping portion and at least a narrower second sleeping portion with respect to the first portion; in two neighboring columns, the seats are arranged in staggered fashion, so that the first portion of a seat of a column is facing a narrower second portion of a seat of the second column.

This staggered arrangement of seats combined with seats that do not present a constant width, once converted into sleepers, enables to accommodate in a given space a larger number of seats without negatively affecting passenger comfort. The widest portion of the seat converted into a sleeper is preferably for receiving the upper body of a passenger while the narrow portions of the sleeper receive the passenger's head and legs. The sleeping surface is not necessarily flat. The seat referred to herein can be an inclinable seat that does not have a considerably horizontal sleeping surface in its "most inclined" position.

One form of beneficial execution provides that each seat, when converted into a sleeper, has a considerably rectilinear longitudinal edge. Such seats can as such be adapted to be arranged in columns either along an aisle or along a cabin wall. In this form of execution, the set or assembly of aircraft seats include for instance at least two types of seats, a first type of seats having a rectilinear longitudinal edge positioned to the right of a passenger occupying said seat and a second type of seats having a rectilinear longitudinal edge positioned to the left of the passenger seated in the same position on this seat. One can then foresee that the seats of the same column are for instance all of one and the same type.

In a first form of execution, seats of the same column of seats are spaced one from the other in such a way that when they are converted into sleepers, the space separating them is less than about ten centimeters. Likewise, the loss of space in the cabin is minimized and one arrives as such at accommodating a greater number of seats in a given space.

In another form of execution, seats of the same column of seats are spaced one from the other in such a way that when they are converted into sleepers, the space separating them permits a passenger to pass through. This configuration can for instance be used when the set or assembly of seats according to the invention are located against a wall of the cabin. Thanks to the passage ways foreseen, access to the seats of the column of seats located along the wall of the cabin can take place without passengers occupying the seats near the wall having to disturb passengers seated in the other column.

In the event that the seats of the same column of seats are spaced one from the other, a piece of luggage can be positioned between two neighboring seats of this column. Here, for instance, it involves a column of seats located along a cabin wall.

A set or assembly of aircraft seats according to the invention comprises two columns of seats, for instance.

In this case, when the seats present a rectilinear longitudinal edge, this set or assembly of seats is for instance delimited by a longitudinal aisle and rectilinear longitudinal edges of seats located on the side of said aisle.

A set or assembly of aircraft seats according to the invention can also include three columns of seats.

In this case, seats of the same column of seats are beneficially spaced one from the other in such a way that when converted into sleepers, the space separating them permits a passenger to pass through. In this fashion, the central column of seats can be accessed without having to disturb passengers of the lateral columns. In this form of execution, the free space between seats of the central column is not beneficial to let a passenger pass through; this space is beneficially used as storage space.

A set or assembly of three columns of seats provides for instance that the seats of each lateral column of seats are spaced one from the other in such a way that when they are converted into sleepers, the space separating them allows a passenger to pass through, and the seats of the central column of seats presenting, when converted into sleepers, a greater length than the length of the seats of the side columns when converted into sleepers. These seats of greater length can then be offered to tall passengers.

A set or assembly of three columns of aircraft seats is preferably delimited longitudinally by two aisles so as to facilitate access to all seats in this set or assembly. Seats of the lateral columns then present beneficially a considerably rectilinear longitudinal edge on the side of the corresponding aisle. Such a set or assembly can present a longitudinal symmetry axis.

In a set or assembly of three columns of aircraft seats according to the invention, seats of the central column can be offset longitudinally with respect to the seats of a side column while they can be aligned with the seats of the other side column. It is also possible to have the seats of the central column longitudinally offset with respect to the seats of the two side columns but with a different offset.

This invention also proposes a set or assembly of aircraft seats comprising four columns of seats.

Such an assembly is for instance made up of two sets or assemblies of two columns of seats as described above.

Seats of the same column of seats of a set or assembly of four columns of seats are preferably spaced one from the other in such a way that when they are converted into sleepers, the space separating them permits a passenger to pass. In this way, all seats of this set or assembly can be accessed without having to disturb the passengers already seated. In such a configuration, the free space between the seats of the central columns can be used to store a suitcase since it is not used to let passengers pass.

Another form of execution of a set or assembly of four seats provides for the fact that the seats of each side column of seats are spaced one from the other in such a way that when converted into sleepers, the space separating them permits a passenger to pass, and the seats of the central columns of seats have, when converted into sleepers, a greater length than the length of the seats of the side columns when converted into sleepers. These seats of the central columns can then accommodate tall passengers.

For a configuration with four columns of seats, one can also foresee that the seats of one of the central columns are aligned with respect to the seats of the other of the central columns but are offset with respect to the seats of the corresponding side column of seats.

This invention also involves an aircraft, characterized by the fact that it comprises a set or assembly of seats as described above.

BRIEF DESCRIPTION OF THE DRAWINGS

Details and advantages of this invention will come out better from the description that follows, referenced against the schematic drawings attached on which:

Illustration 1 represents schematically as a view from the top, a section of an aircraft cabin with five columns of seats.

Figures 3, 4:
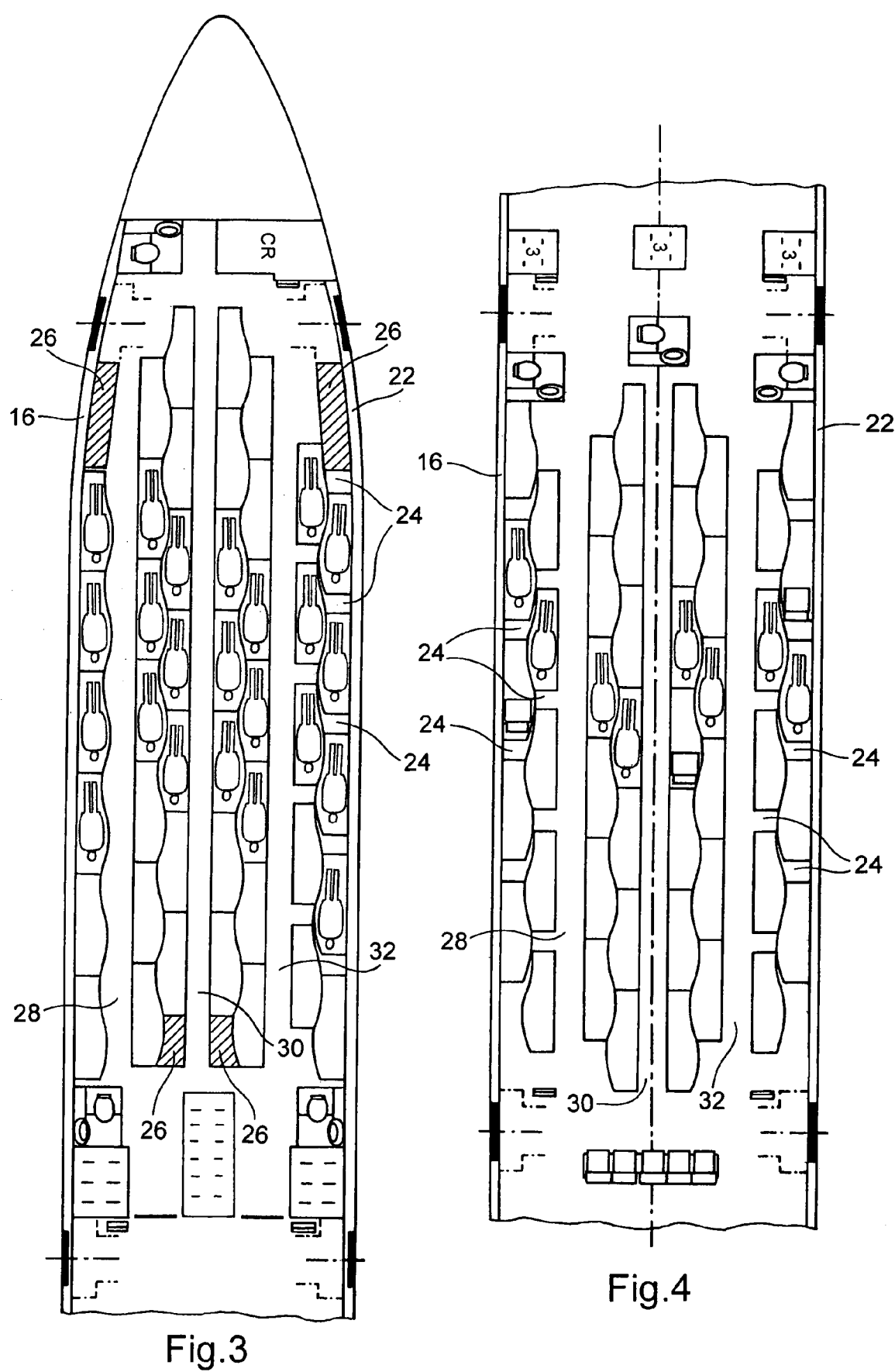

Illustration 2 is a view similar to illustration 1 for a cabin showing seven columns of seats.

Illustration 3 is a layout variant of the cabin shown on illustration 2, and Illustration 4 is a schematic top view of a section of aircraft cabin comprising eight columns of seats.

DESCRIPTION OF THE PREFERRED EMBODIMENTS

Illustrations of the drawing show aircraft cabin compartments in which convertible seats are arranged. As such, a traveler taking place in such a compartment can travel in a seated position as well as in a stretched out or almost stretched out position.

Viewed from above, each seat shown on the drawing, when converted into a sleeper (flat or almost flat) has a contour adapted to the human body. The part of the sleeper that is to accommodate the upper body of the passenger has the greatest width while the parts of the sleeper accommodating the passenger's legs and head are narrower in width. Even though not illustrated on the drawing, it is quite possible to envision here the use of modules as those shown in document EP-1 364 874.

In the attached drawing, each seat, when converted into a sleeper, shows a contour of the same form (nearly symmetrical). This contour (illustration 1) shows first of all two rectilinear line transversal ends. A first end 2 is located on the side of the sleeper accommodating the feet of a traveler while the other transversal end 4 is located at the end of the sleeper to accommodate this traveler's head. These transversal ends are shown in a straight line. However, other forms may be considered here: rounded angles, fully rounded angles, elliptic, etc.

These transversal ends 2, 4 are linked by longitudinal edges. A first longitudinal edge has a straight line and extends perpendicularly to transversal edges 2, 4. This rectilinear longitudinal edge is hereinafter called rectilinear edge 6 in the description.

The other longitudinal edge presents the form of a broken line. First of all, starting from transversal edge 2, this broken line extends to transversal edge 4 while forming a first section 8 that is considerably parallel to rectilinear edge 6. As such, we have a narrow sleeper portion. Second section 10 of the broken line forming the second longitudinal edge provides a widening of the sleeper. The corresponding part of the sleeper accommodates for instance, the traveler's calves and midriff.

A third section 12 of the broken line of the longitudinal edge is again parallel with rectilinear edge 6. This section is for instance the portion of the sleeper to accommodate the traveler's chest.

Finally, the last and fourth section 14 of the broken line forming the second longitudinal edge provides a reduced sleeper width. The part of the sleeper for this last and fourth section 14 is to accommodate for instance a traveler's head.

On the various illustrations of the drawing, please note that there are two types of seat. The first type of seat is such that when a traveler is stretched out on his back on the sleeper, with his head in this case turned towards the back of the plane, rectilinear edge 6 is located on his right. For the other type of seat, under the same conditions, rectilinear edge 6 of the corresponding sleeper is located to the left of the traveler.

On illustration 1, five columns of seats are represented. Here and in the remainder of the description, by "columns of seats" is understood a set or assembly of seats arranged one behind the other, longitudinally with respect to the airplane.

A first column of seats is arranged between left wall 16 of the cabin and a first aisle 18. In this column, the seats are arranged one behind the other in such a way that in the sleeper position, one front traversal edge 2 comes in contact, or almost in contact, with a neighboring transversal edge 4.

As such a minimum space is left between two neighboring seats of the same column converted into sleepers. In this column of seats, all seats are of the same type and rectilinear edge 6 of these seats is located each time along left wall 16 of the cabin.

Considerably in the center of the cabin shown, there is a set or assembly of two columns. This set or assembly is arranged between aisle 18 and a second aisle 20. In each of these columns, the same type of seat is found each time. For seats of the columns located on the side of aisle 18, rectilinear edge 6 is located to the left of a passenger traveling in the direction of travel of the airplane while in the second column, located on the side of aisle 20, rectilinear edge 6 is located to the right of a passenger traveling in the direction of travel of the airplane.

On the drawing, one can see that the passengers for this set or assembly of two columns are arranged in a staggered fashion. Indeed, the seats of the columns are not arranged to achieve transversal rows, in other words, perpendicular to the columns. Indeed, in these two neighboring columns, the seats are positioned one after the other so as to leave a minimum space between two neighboring seats converted into sleepers and are offset in the longitudinal sense one with respect to the other. This offset is selected in such a way that the widest portion of the sleeper, being third section 12, of a column, is considerably located at a portion of a lesser width of a sleeper seat of the neighboring column. As such, at the center of the set of the two columns, the widest portion of a seat of a column is located at the portion of the sleeper seat coinciding with first section 8 of a seat of the neighboring column.

The last two columns of seats are arranged between aisle 20 and a right cabin wall 22. The columns of this set or assembly of seats are distinguished from the previously described columns by the fact that a space 24 is left free between two neighboring sleeper seats. This free space 24 is sufficient to let a passenger pass. As such, in the column adjacent to aisle 20, passage ways are provided to permit access to the seats located along right cabin wall 22. Passengers having a seat along this right cabin wall 22 can as such access their seat without disturbing anyone sitting in his/her seat in the column adjacent to aisle 20.

For these two columns presenting free spaces 24, one finds an offset similar to the one described previously for two neighboring columns. Indeed, as can be seen on the drawing, except possibly for the seats located at the ends of a column, the widest part of a seat, coinciding with section three 12, is found at a narrower part, in this case, the part coinciding with first section 8.

Taking into account the offset existing between the various columns, spaces 26 remain unoccupied by seats. They can be used to house storage cabinets or closets.

On illustration 2, the aircraft cabin shown includes seven columns of seats. For this configuration, we find three aisles referenced as 28, 30 and 32. Here also, there is a left cabin wall 16 and a right cabin wall 22. The column of seats located along left cabin wall 16 is similar to the column of seats located along left cabin wall 16 of illustration 1. Likewise, the sets or assemblies of two columns of seats located between aisles 28 and 30, respectively 30 and 32, are similar to the set or assembly of two columns of seats shown on illustration 1 between aisles 18 and 20. The set or assembly of two columns of seats located on the side of the right cabin wall 22 is also similar to the one of illustration 1 also located along right cabin wall 22.

On this illustration 2, one observes that the columns located along cabin walls 16 and 22, towards the front of the aircraft, seats are not perfectly aligned one behind the other but the form of the column is adapted to the form of the corresponding cabin wall. The form of the seats allows here for a better adaptation to the form of the cabin wall.

Illustration 3 is a slight execution variant of the layout of illustration 2 that permits placing a larger number of seats in the same space.

Finally, on illustration 4, there are three aisles 28, 30 and 32. The sets or assemblies of two columns of seats located each time between two aisles are similar to the sets or assemblies of two columns of seats positioned between two aisles of illustrations 2 and 3. On the side of the cabin walls, here we have each time sets or assemblies of two columns of seats, with the seats being spaced one from the other in the same column of seats.

Configurations other than those shown on the drawing may be considered. As such, for instance, in the narrower cabins, on might provide for four columns of seats with a single central aisle. Then, a configuration is obtained similar to the one of illustration 4, without however the four central columns of seats.

One may also consider sets or assemblies of three or four columns of seats. As such, for instance, in the configuration of illustration 4, one can eliminate central aisle 30 and join, one against the other, the two sets or assemblies of two columns of seats located on either side of this central aisle 30. This configuration has the inconvenience that passengers seated on the sleeper seats of the central columns of this set or assembly of four columns must disturb their neighbor if they want to get to or get up from their seats. To avoid this inconvenience, it suffices to create passage ways between the seats as shown on illustration 4 for instance for the columns of seats located on the side of cabin walls 18 and 22.

In these sets or assemblies of four columns of seats, one has seats of the same type for each column (rectilinear edge 6 on the right or on the left) and an alternation of seat types from one column to the other. In this set or assembly of four columns of seats, there is a longitudinal offset between seats of two neighboring columns except for the two central columns. For these two columns, there may be no offset or an offset identical to the offset existing between the two other columns, or even, a different offset.

As stated above, within the framework of the invention, it is also possible to have sets or assemblies of three columns of seats. Preferably, to facilitate access to the seats of the central column, a space, such as spaces 24 of illustrations 1 to 4, is provided each time between two neighboring seats of the same column of seats. Here also, beneficially, a single type of seat is provided in each column of seats and an alternation of types of seats from one column to the other. For such a configuration, with three columns of seats, one can provide for a longitudinal offset between two seats of two neighboring columns but it is also possible to have an offset for the neighboring columns of seats along their non-rectilinear longitudinal edges of seats and have no offset (or else the same offset or else a different offset) for seats of neighboring columns along two rectilinear edges.

For this configuration of three columns of seats, it may be beneficial to provide a third type of seat for the central column. It would be a seat, symmetrical in form with respect to its longitudinal center line. Each longitudinal edge of such a seat would present a form as described and referenced for illustration 1. Use of this third type of seat thus permits optimizing the width of the set or assembly of three columns of seats, in other words, to offer the greatest possible comfort to passengers occupying these seats while having the narrowest overall width possible for the three columns. Here one observes that the spaces provided above between seats of the same column are not used for letting travelers pass through the free spaces between the seats of the central column. Then, one can provide that the sleepers of these seats of the central column offer a longer sleeping surface. Such a sleeper seat can then be assigned to a tall passenger. One can also use the free spaces between the seats of this central column to store luggage. According to the layout adopted for the cabin interior, if enough storage spaces are provided, any luggage stored overhead can be eliminated.

The observations made above about the use of free space between two sleeper seats of the central column of a set or assembly of three columns of seats (execution of a longer sleeping surface or storage space), can also be applied to the central columns of a set or assembly of four columns of seats described above.

The forms of execution shown above enable to access all seats described without having to disturb a passenger occupying another seat.

Needless to say, the form of the seats, when converted into sleepers, may vary from the forms described above. For instance, one can also use modules of seats as shown in document EP-1 364 874 A1. By referring to illustration 5A of this document, which is also the summary illustration, one considers a module like those shown on this illustration. This module of the summary illustration shows a rectilinear edge (26) that is positioned to the left of a traveler taking place in the module shown. This module can cooperate with another similar module in which the rectilinear edge (28) is located to the right of a passenger traveling within this module. These two modules are then positioned side by side so that a first segment (26) of one of these modules cooperates with a second segment (30) of the other module. As such, one obtains configurations similar to those shown on illustrations 1 to 4 of the drawing.

This invention is not limited to the various forms of execution described above as non-limiting examples. It also applies to all execution variants accessible to the tradesman within the framework of the claims below.

The invention is as such not limited to the aircraft cabins capable of holding five, seven or eight columns of seats. The invention adjusts itself to all cabin widths and can be considered starting with a cabin in which three columns of seats can be installed.

Obviously, numerous modifications and variations of the present invention are possible in light of the above teachings. It is therefore to be understood that, within the scope of the appended claims, the invention can be practiced otherwise than as specifically described herein.

What is claimed as new and desired to be secured by Letters Patent of the United States is:

1. An arrangement of aircraft seats for outfitting an aircraft cabin comprising:
    at least two columns of neighboring seats, with the seats arranged one behind the other in each of the columns of seats and each seat being convertible into a sleeper so as to present a stretched out sleeping surface,
    wherein all seats of the arrangement are turned in the same direction, each seat when converted into a sleeper presents a first sleeping portion and at least a second narrower sleeping portion with respect to the first portion, and in two neighboring columns, the seats are staggered, so that the first part of a seat of a first column is closer to the second narrower portion of a seat of the second column than to the first part of the seat of a second column, and the first portion of the seat of the first column is at substantially a same distance from a floor of the cabin as the first portion of the seat of the second column, and
    wherein, in at least one of said at least two columns, neighboring seats are in contact with each other when converted into sleepers.

2. The arrangement of aircraft seats according to claim 1, wherein each seat, when converted into a sleeper, includes a substantially rectilinear longitudinal edge.

3. The arrangement of aircraft seats according to claim 2, wherein the arrangement includes at least two types of seats, a first type of seats presenting a rectilinear longitudinal edge located to the right of a passenger occupying such seat and a second type of seats presenting a rectilinear longitudinal edge located to the left of the passenger occupying this seat in the same position.

4. The arrangement of aircraft seats according to claim 3, wherein the seats of the same column are all of the same type.

5. The arrangement of aircraft seats according to one of claims 1 to 4, wherein the neighboring seats of each of said at least two columns of seats are one against another when converted into sleepers.

6. The arrangement of aircraft seats according to one of claims 1 to 4, wherein the neighboring seats of a column of seats, other than said at least one column, are spaced one from the other in such a way that when converted into sleepers, a space separating them enables a passenger to pass.

7. The arrangement of aircraft seats according to one of claims 1 to 4, wherein the seats of a column of seats, other than said at least one column, are spaced one from the other.

8. The arrangement of aircraft seats according to claim 1, wherein the arrangement comprises two columns of seats.

9. The arrangement of aircraft seats according to claims 2 or 8, wherein the arrangement is delimited by a longitudinal aisle, and rectilinear longitudinal edges of seats are located on the side of such aisle.

10. An arrangement of aircraft seats for outfitting an aircraft cabin comprising:
    at least three columns of seats, with the seats arranged one behind the other in each of the columns of seats and each seat being convertible into a sleeper so as to present a stretched out sleeping surface,
    wherein all seats of the arrangement are turned in the same direction, each seat when converted into a sleeper presents a first sleeping portion and at least a second narrower sleeping portion with respect to the first portion, and in two neighboring columns of said at least three columns, the seats are staggered, so that the first part of a seat of a first column of said two neighboring columns is closer to the second narrower portion of a seat of a second column of said two neighboring columns than to the first part of the seat of the second column, and the first portion of the seat of the first column is at substantially a same distance from a floor of the cabin as the first portion of the seat of the second column.

11. The arrangement of aircraft seats according to claim 10, wherein the seats of the same column of seats are spaced one from the other in such a way that when converted into sleepers, a space separating them enables a passenger to pass.

12. The arrangement of aircraft seats according to claim 11, wherein a space between the seats of a central column is a storage space.

13. The arrangement of aircraft seats according to claim 10, wherein the seats of each lateral column of seats are spaced one from the other in such a way that when converted into sleepers, a space separating them enables a passenger to pass, and wherein the seats of a central column of seats, when converted into sleepers, have a length greater than the length of the seats of the lateral column when converted into sleepers.

14. The arrangement of aircraft seats according to claim 10, wherein the arrangement is longitudinally delimited by two aisles.

15. The arrangement of aircraft seats according to claim 14, wherein the seats of lateral columns present a longitudinal edge that is substantially a straight line on the side of the corresponding aisle.

16. The arrangement of aircraft seats according to claim 15, wherein the arrangement presents a longitudinal symmetrical centerline.

17. The arrangement of aircraft seats according to claim 10, wherein the seats of a central column are offset longitudinally with respect to the seats of a side column while they are aligned with the seats of the other side column.

18. The arrangement of aircraft seats according to claim 10, wherein the seats of a central column are offset longitudinally with respect to the seats of the two side columns but with a different offset.

19. An arrangement of aircraft seats for outfitting an aircraft cabin comprising:
at least four columns of seats, with the seats arranged one behind the other in each of the columns of seats and each seat being convertible into a sleeper so as to present a stretched out sleeping surface,
wherein all seats of the arrangement are turned in the same direction, each seat when converted into a sleeper presents a first sleeping portion and at least a second narrower sleeping portion with respect to the first portion, and in two neighboring columns of said at least four columns, the seats are staggered, so that the first part of a seat of a first column of said two neighboring columns is closer to the second narrower portion of a seat of a second column of said two neighboring columns than to the first part of the seat of the second column, and the first portion of the seat of the first column is at substantially a same distance from a floor of the cabin as the first portion of the seat of the second column.

20. The arrangement of aircraft seats according to claim 19, wherein the seats of a same column of seats are spaced one from the other in such a way that when converted into sleepers, a space separating them enables a passenger to pass.

21. The arrangement of aircraft seats according to claim 19, wherein the seats of each side column of seats are spaced one from the other in such a way that when converted into sleepers, a space separating them enables a passenger to pass, and wherein the seats of central columns of seats, when converted into sleepers, have a length that is greater than the length of the seats of the side columns when converted into sleepers.

22. The arrangement of aircraft seats according to claim 19, wherein the seats of one of central columns are aligned with respect to the seats of the other central column but are offset with respect to the seats of the corresponding side column of seats.

23. An aircraft comprising:
an aircraft cabin; and
an arrangement of seats according to claim 1, said arrangement being inside said aircraft cabin.

24. The arrangement of aircraft seats according to claim 1, wherein each sleeper is configured to be converted from a single seat.

25. The arrangement of aircraft seats according to claim 10, wherein the seats of a same column of seats are located a predetermined distance apart, the predetermined distance great enough to allow a suitcase to be placed between adjacent seats in the same column.

26. The arrangement of aircraft seats according to claim 10, wherein said at least three columns consist of five columns, with one of said five columns being a lone column and four of said five columns being paired in two pairs of said two neighboring columns, a first pair being separated from a second pair by a first aisle, and said lone column being separated from said second pair by a second aisle.

27. The arrangement of aircraft seats according to claim 10, wherein said at least three columns consist of seven columns, with one of said seven columns being a lone column and six of said seven columns being paired in three pairs of said two neighboring columns, a first pair being separated from a second pair by a first aisle, the second pair being separated from a third pair by a second aisle and said lone column being separated from said third pair by a third aisle.

28. The arrangement of aircraft seats according to claim 10, wherein said at least three columns consist of eight columns being paired in four pairs of said two neighboring columns, a first pair being separated from a second pair by a first aisle, the second pair being separated from a third pair by a second aisle and the third pair being separated from a fourth pair by a third aisle.

* * * * *